Nov. 16, 1926.　　　　　　　　　　　　　　　　1,607,282
J. KOENIG
HOT AIR TURBINE
Filed Dec. 10, 1925　　　3 Sheets-Sheet 3

Inventor:
Joseph Koenig
By
Attorneys

Patented Nov. 16, 1926.

1,607,282

UNITED STATES PATENT OFFICE.

JOSEPH KOENIG, OF MANITOWOC, WISCONSIN.

HOT-AIR TURBINE.

Application filed December 10, 1925. Serial No. 74,561.

This invention relates to hot air turbines.

This invention is an improvement over that disclosed in my copending application for hot air turbine, Number 12,874, filed March 3, 1925.

Objects of this invention are to provide a hot air turbine which is of simple construction throughout, which may be easily made, and which does not require the constant attention of an operator.

Further objects are to provide a hot air turbine in which an approach to a uni-directional flow of the hot and cool gases is provided so that the maximum efficiency may be attained by the device considered as an entire unit.

An embodiment of the invention is shown in the accompanying drawings, in which:—

Figure 1:
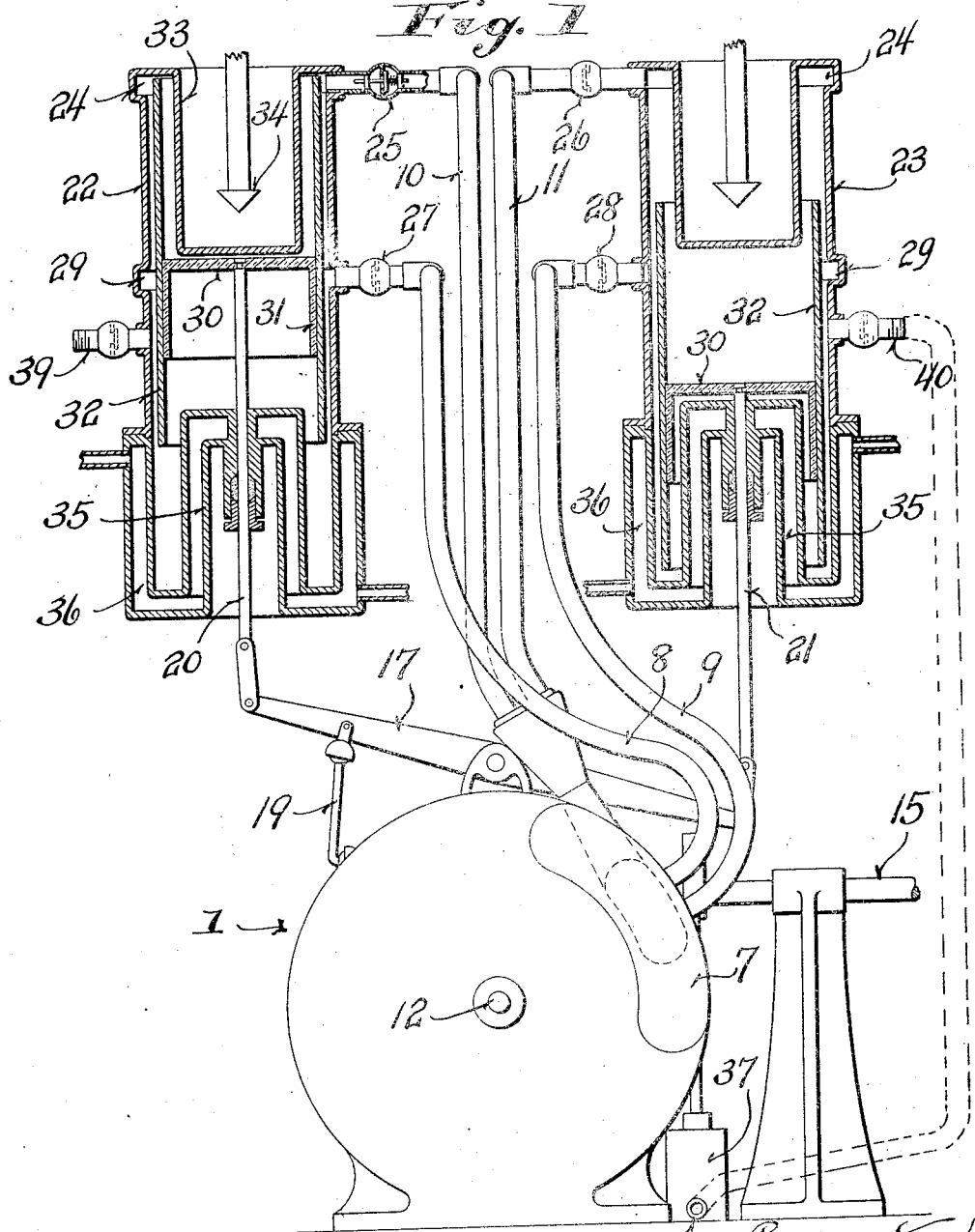
Figure 1 is a front elevation with the air conditioning cylinders in section.

Referring to the drawings, it will be seen that a turbine has been illustrated and indicated generally by the reference character 1. This turbine comprises a plurality of movable vanes 2 and stationary vanes 3. It is equipped with an inlet nozzle 4 which is preferably divided by means of partitions 5 into a plurality of sections and is adapted to direct the heated pressure gases against the moving vanes. The casing 6 of the turbine is expanded or bulged out, as indicated at 7, and from this portion of the device a pair of outlet pipes extend, as indicated at 8 and 9 in Figure 1. The nozzle 4 is supplied by a pair of high pressure pipes 10 and 11.

Figure 2:
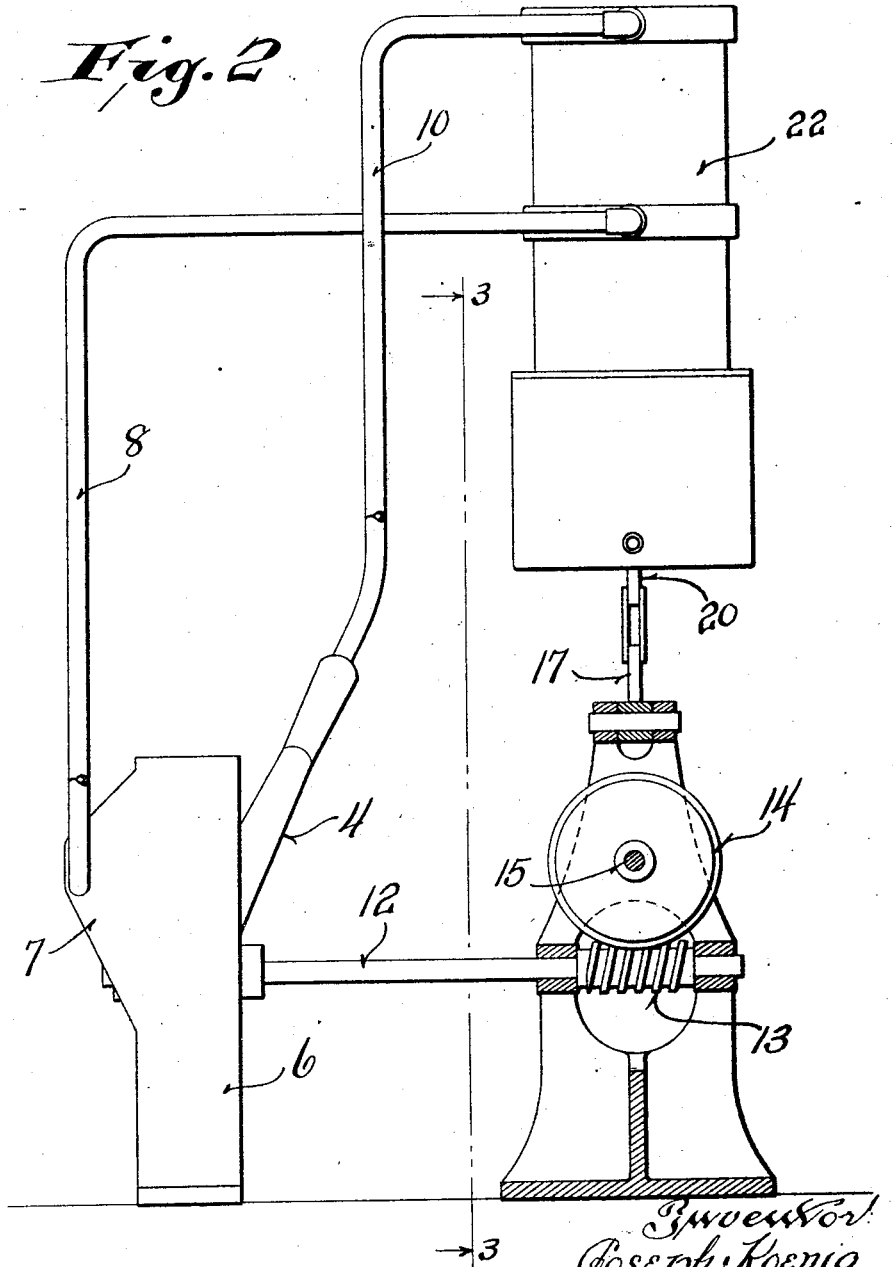
Figure 2 is a view showing one-half of the air conditioning cylinders and associated piping removed and showing a portion of the mechanism in section.
Figure 3:
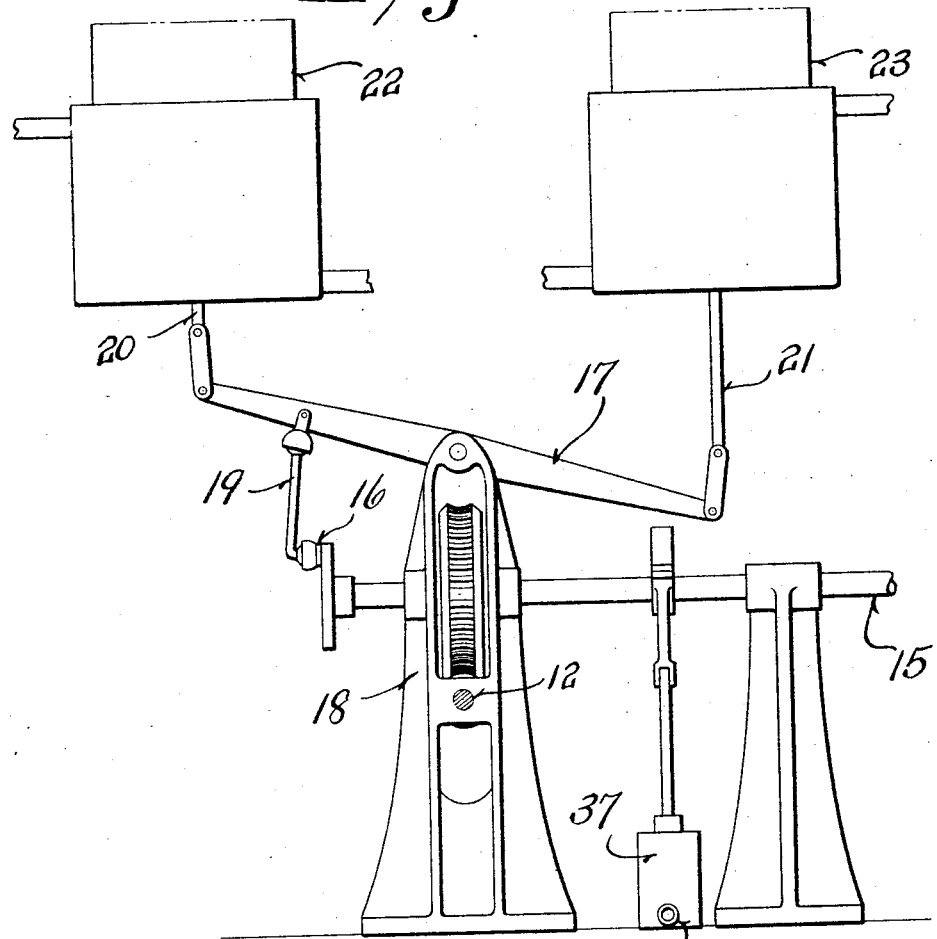
Figure 3 is a sectional view on the line 3—3 of Figure 2.
Figure 4:
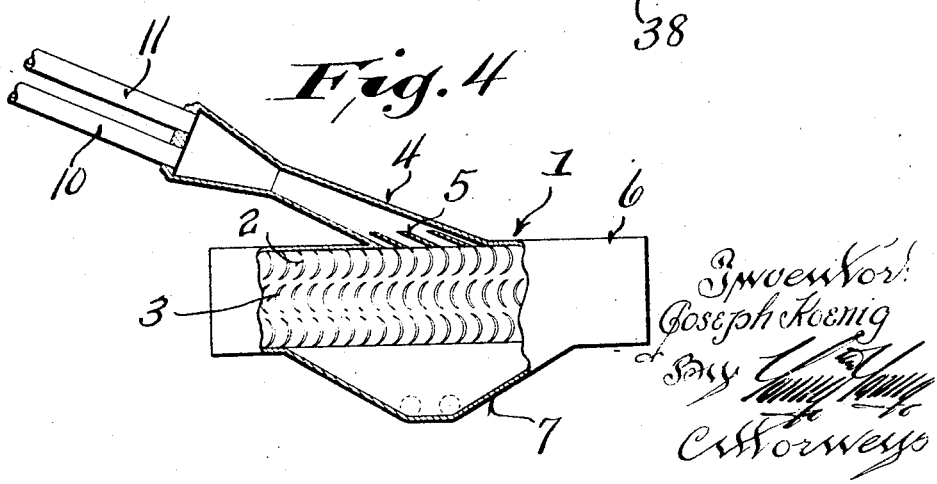
Figure 4 is a section through a part of the turbine.

The turbine has a driving shaft 12 (see Figures 1, 2 and 3) which carries a worm 13 meshing with a worm wheel 14, such worm wheel being mounted on a transverse shaft 15. Any form of apparatus may be employed for taking power from this shaft. As shown in Figure 3, this shaft is provided with a crank 16 which operates a rocking lever 17 pivoted to the upper end of the frame 18 which carries the worm and worm wheel. This rocking lever 17 is joined to the crank by means of a pitman 19 provided with ball and socket joints at its ends.

It is to be noted that the rocking beam or lever 17 is joined at its ends by means of links to the piston rods 20 and 21 which pass into the air conditioning cylinders indicated generally at 22 and 23. Thus, as the power shaft 15 rotates, it oscillates the lever 17 and consequently reciprocates the piston rods 20 and 21 in opposite directions.

Returning to the piping for conducting the heated air or gases to and from the turbine, it will be seen from reference to Figure 1, that the pipes 10 and 11 pass upwardly to the upper ends of the cylinders 22 and 23, respectively, and join such cylinders at the enlarged annular portion 24. Check valves 25 and 26 are provided in the pipe lines 10 and 11 and open outwardly from the respective air conditioning cylinders, as shown in Figure 1.

The pipes 8 and 9 open also into the cylinders 22 and 23, as shown in Figure 1, but enter such cylinders a material distance downwardly from their upepr ends, such cylinders being provided with enlargements 29 which extend angularly around the cylinders. They are similarly equipped with check valves 27 and 28 which, however, open inwardly towards the respective air conditioning cylinders.

The construction of air conditioning cylinders is identically the same and only one need, therefore, be described in detail. For example, consider the cylinder 22. The piston rod 20 operates the piston 30, such piston preferably being either insulated against the transmission of heat or else constructed of heat insulating material itself. This piston is provided with downwardly extending insulating portions 31 and also carries a metal shell 32 which is slightly out of contact with the cylinder walls. This metal shell, therefore, is carried by and reciprocates with the piston and forms in effect a portion thereof.

The upper end of the cylinder is provided with an inwardly extending shell 33 within which a burner 34 of any suitable type is positioned so as to heat the shell and the upper end of the cylinder. The lower end of the cylinder is provided with an upwardly extending shell 35 which, together with the lower end of the cylinder, is provided with a water jacket 36 so as to maintain the lower end cylinder in a cool condition.

Preferably a small air pump 37, as shown in Figure 3, is driven from the power shaft 15. It is provided with an outlet portion 38 which may be connected by means of a hose with the fittings 39 and 40 of the air conditioning cylinders 22 and 23, respectively, to place the apparatus under initial compression. One position of the hose is shown in dotted lines in Figure 1.

In operating the apparatus, the heated gases expand. For instance, in the position shown in Figure 1, the gases have expanded in the cylinder 23 and have passed downwardly through the pipe 11 into the nozzle 4, thus driving the turbine. The discharged air from the turbine passes upwardly through the pipe 8 and into the cylinder 22. It is directed downwardly towards the chilled end of the cylinder by means of the sleeve 32 and consequently is contracted. However, as the crank 16 rotates, the piston 30 is moved downwardly, thus displacing the air from the chilled end of the cylinder and causing it to surge about the hot end of the cylinder. This causes the air to expand and to pass downwardly through the pipe 10 to the nozzle 4, thus driving the turbine. At the same time the air discharged from the turbine passes upwardly through the pipe 9 and enters the air conditioning cylinder 23, the sleeve 32 of such cylinder being elevated and directing the air downwardly towards the chilled end of the cylinder, thus causing a contraction in the volume of the air.

It will be seen that as long as the air conditioning cylinders are maintained hot at one end and cool at the other that the turbine will continuously rotate and will deliver power.

It is to be particularly noted that the relatively cooler air passes into the cylinders at a point spaced downwardly from their heated ends and, therefore, does not have to traverse the pipes 10 and 11 towards the hot end of the cylinder. In this manner a unidirectional flow of air is maintained in the system and consequently the maximum efficiency is attained.

It will be seen that a novel type of hot air turbine has been provided in which simplicity of construction is followed throughout, but in which a high degree of efficiency is attained.

Although the invention has been described in considerable detail, such description is intended as illustrative rather than limiting as the invention may be variously embodied and as the scope of such invention is to be determined as claimed.

I claim:

1. In a hot air motor the combination of a turbine having an inlet nozzle and an outlet portion, a plurality of air conditioning cylinders each having a hot end and a cold end, pistons within said cylinders for circulating the air, means driven by said turbine for operating said pistons, discharge pipes leading from said cylinders to said inlet nozzle, return pipes joining said cylinders and the outlet portion of said turbine, and valves connected to said pipes for controlling the direction of flow of the air.

2. A hot air motor comprising a turbine having an inlet nozzle and an outlet portion, a plurality of air conditioning cylinders each having hot and cold ends, pistons mounted within said cylinders for circulating the air alternately towards said hot and cold ends, an outlet pipe extending from each cylinder adjacent its hot end to said inlet nozzle, an inlet pipe extending from the outlet portion of said turbine to said cylinders at points remote from the heated ends, valves connected to said inlet and outlet pipes for controlling the direction of flow, and means driven by said turbine for reciprocating said pistons in opposite directions.

3. A hot air motor comprising a turbine having an inlet nozzle and an outlet portion, a plurality of air conditioning cylinders each having hot and cold ends, pistons mounted within said cylinders for circulating the air alternately towards said hot and cold ends, an outlet pipe extending from each cylinder adjacent its hot end to said inlet nozzle, an inlet pipe extending from the outlet portion of said turbine to said cylinders at points remote from their heated ends, valves connected to said outlet and inlet pipes for controlling the direction of flow, and a lever reciprocated by said shaft and operatively connected to said pistons.

4. In a hot air motor the combination of a turbine having an inlet nozzle and a discharge portion, and having a shaft, a power shaft connected to said turbine shaft by means of reduction gearing, a crank mounted upon said power shaft, a lever pivoted and connected by means of a link to said crank, a pair of air conditioning cylinders having hot ends and cold ends, and having pistons connected to opposite ends of said lever, delivery pipes extending from the heated ends of said cylinders to the inlet nozzle of said turbine, and discharge pipes extending from the discharge portion of said turbine to the air conditioning cylinders, said air conditioning cylinders having annular enlargements adjacent each of said pipes, and valves connected to said pipes for maintaining a unidirectional flow of air.

5. In a hot air motor the combination of a turbine having an inlet nozzle and a discharge portion, and having a shaft, a power shaft connected to said turbine shaft by means of reduction gearing, a crank mounted upon said power shaft, a lever pivoted intermediate its ends and connected by means of a link to said crank, a pair of air conditioning cylinders having hot ends and cold ends, and having pistons connected to opposite ends of said lever, delivery pipes extending from the heated ends of said cylinders to the inlet nozzle of said turbine, discharge pipes extending from the discharge portion of said turbine to the air conditioning cylinders, said air conditioning cylinders having annular enlargements adjacent each of said pipes, and valves connected to said pipes for maintaining a unidirectional flow of air, and means for permitting the placing of the system under initial compression.

In testimony that I claim the foregoing I have hereunto set my hand at Milwaukee, in the county of Milwaukee and State of Wisconsin.

JOSEPH KOENIG.